US008406906B2

(12) United States Patent
Connelly

(10) Patent No.: US 8,406,906 B2
(45) Date of Patent: Mar. 26, 2013

(54) BASEBALL EVENT OUTCOME PREDICTION METHOD AND APPARATUS

(75) Inventor: Thomas Connelly, North Quincy, MA (US)

(73) Assignee: Dream Big Baseball, Inc., Wilmington, DE (US)

( * ) Notice: Subject to any disclaimer, the term of this patent is extended or adjusted under 35 U.S.C. 154(b) by 658 days.

(21) Appl. No.: 12/471,354

(22) Filed: May 23, 2009

(65) Prior Publication Data

US 2010/0298958 A1 Nov. 25, 2010

(51) Int. Cl.
*G06F 19/00* (2011.01)

(52) U.S. Cl. ................ 700/93; 700/91; 463/16; 463/17; 463/40; 463/42

(58) Field of Classification Search .................... 700/91, 700/93; 463/16, 17, 40, 42
See application file for complete search history.

(56) References Cited

U.S. PATENT DOCUMENTS

| | | | | |
|---|---|---|---|---|
| 6,122,559 | A * | 9/2000 | Bohn | 700/91 |
| 6,170,829 | B1 * | 1/2001 | Harvey | 273/298 |
| 6,325,725 | B1 * | 12/2001 | Tsujita | 473/70 |
| 6,984,176 | B2 * | 1/2006 | Bishop | 463/42 |
| 7,376,474 | B2 * | 5/2008 | Graepel et al. | 700/93 |
| 7,840,288 | B2 * | 11/2010 | Graepel et al. | 700/93 |
| 7,850,523 | B2 * | 12/2010 | Ghosh | 463/25 |
| 2008/0113734 | A1 * | 5/2008 | Watkins et al. | 463/19 |
| 2009/0023495 | A1 * | 1/2009 | Koustas et al. | 463/25 |

* cited by examiner

*Primary Examiner* — Pierre Eddy Elisca
*Assistant Examiner* — Shahid Kamal
(74) *Attorney, Agent, or Firm* — Lando & Anastasi, LLP

(57) ABSTRACT

A computer-implemented method of predicting outcomes of hypothetical events which can occur during a game of baseball, includes: accumulating and storing in a computer memory a statistical database of the cumulative effects of latency and engrams specific to an individual batter having individual batter capabilities and an individual pitcher having individual pitcher capabilities; selecting a pitch, by a user, from amongst pitches compatible with the individual pitcher capabilities; selecting a swing, by a user, from amongst swings compatible with the individual batter capabilities; computing in a computer processor a statistical performance of the individual pitcher of the selected pitch; computing in a computer processor a statistical performance of the individual batter of the selected swing; and matching in a computer processor the statistical performance of the individual pitcher with the statistical performance of the individual batter so as to compute an outcome.

12 Claims, 6 Drawing Sheets

BASEBALL EVENT OUTCOME PREDICTION METHOD AND APPARATUS

BACKGROUND OF INVENTION

1. Field of Invention

The invention relates to methods and apparatus for analyzing baseball events. More particularly, the invention relates to such methods and apparatus applicable to virtual gaming, training, scouting, game preparation and other, similar tasks.

2. Discussion of Related Art

Baseball writer, historian and statistician Bill James is well-known for having created a "new" statistical paradigm for understanding the game of baseball. Statistical baseball analysis examines the effects of play, utilizing a large number of events to produce a meaningful sample. Statistics can, in a bulk sense, predict likely outcomes of aggregate events. For example, knowing a batter's on-base percentage (OBP), that batter's effect on team scoring, and so, perhaps, the outcome of a game, can be estimated; however, the result of any particular matchup between that batter and any particular pitcher cannot be determined. Current paradigms cannot produce such detailed results.

SUMMARY OF INVENTION

According to one embodiment of aspects of the invention, a computer-implemented method of predicting outcomes of hypothetical events which can occur during a game of baseball, includes: accumulating and storing in a computer memory a statistical database of the cumulative effects of latency and engrams specific to an individual batter having individual batter capabilities and an individual pitcher having individual pitcher capabilities; selecting a pitch, by a user, from amongst pitches compatible with the individual pitcher capabilities; selecting a swing, by a user, from amongst swings compatible with the individual batter capabilities; computing in a computer processor a statistical performance of the individual pitcher of the selected pitch; computing in a computer processor a statistical performance of the individual batter of the selected swing; and matching in a computer processor the statistical performance of the individual pitcher with the statistical performance of the individual batter so as to compute an outcome. In one variation, matching further comprises: determining to be a swing and miss those situations where a selected off-speed pitch is not anticipated by the user selecting the swing. In another variation, matching further comprises: determining to be a swing and miss those situations where a four-seam fastball above the belt is selected and the swing selected does not anticipate the four-seam fastball above the belt. According to yet other variations, matching further comprises: determining to be a swing and miss those situations where a four-seam fastball above the belt having a change in velocity from an immediately preceding pitch is selected and the swing selected does not anticipate the four-seam fastball above the belt having a change in velocity, determining to be a swing and miss where the bat loops under the ball those situations where a selected pitch is targeted to an outside margin of the plate and the swing does not anticipate where the selected pitch is targeted, determining the miss to produce incomplete contact resulting in a foul ball, ground ball, pop-up or fly ball, determining to be a solid contact those situations where a selected pitch passes through a central portion of a strike zone or determining to be a swing and miss those situations where a selected pitch has unexpected movement in a final 0.100 seconds of flight, making determination of pitch location by the batter impossible due to latency. The selected pitch can be a knuckleball.

According to another embodiment of aspects of the invention, a computer-implemented method of preparing a baseball player to face an opposing baseball player, one player being an individual batter and another player being an individual pitcher, includes: accumulating and storing in a computer memory a statistical database of the cumulative effects of latency and engrams specific to the individual batter having individual batter capabilities and the individual pitcher having individual pitcher capabilities; selecting a pitch, by a user, from amongst pitches compatible with the individual pitcher capabilities; selecting a swing, by a user, from amongst swings compatible with the individual batter capabilities; computing in a computer processor a statistical performance of the individual pitcher of the selected pitch; computing in a computer processor a statistical performance of the individual batter of the selected swing; and matching in a computer processor the statistical performance of the individual pitcher with the statistical performance of the individual batter so as to compute an outcome.

According to yet another embodiment of aspects of the invention, a computer-implemented method of scouting a baseball player by evaluating performance against an opponent, one of the baseball player and the opponent being an individual pitcher and another of the baseball player and the opponent being an individual batter, includes: accumulating and storing in a computer memory a statistical database of the cumulative effects of latency and engrams specific to the individual batter having individual batter capabilities and the individual pitcher having individual pitcher capabilities; selecting a pitch, by a user, from amongst pitches compatible with the individual pitcher capabilities; selecting a swing, by a user, from amongst swings compatible with the individual batter capabilities; computing in a computer processor a statistical performance of the individual pitcher of the selected pitch; computing in a computer processor a statistical performance of the individual batter of the selected swing; and matching in a computer processor the statistical performance of the individual pitcher with the statistical performance of the individual batter so as to compute an outcome.

According to yet a further embodiment of aspects of the invention, a computer-implemented method of training a baseball player to face an opposing baseball player, one player being an individual batter and another player being an individual pitcher, includes: accumulating and storing in a computer memory a statistical database of the cumulative effects of latency and engrams specific to the individual batter having individual batter capabilities and the individual pitcher having individual pitcher capabilities; selecting a pitch, by a user, from amongst pitches compatible with the individual pitcher capabilities; selecting a swing, by a user, from amongst swings compatible with the individual batter capabilities; computing in a computer processor a statistical performance of the individual pitcher of the selected pitch; computing in a computer processor a statistical performance of the individual batter of the selected swing; matching in a computer processor the statistical performance of the individual pitcher with the statistical performance of the individual batter so as to compute an outcome; and instructing the baseball player regarding improvements to their performance indicated by the computed outcome.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
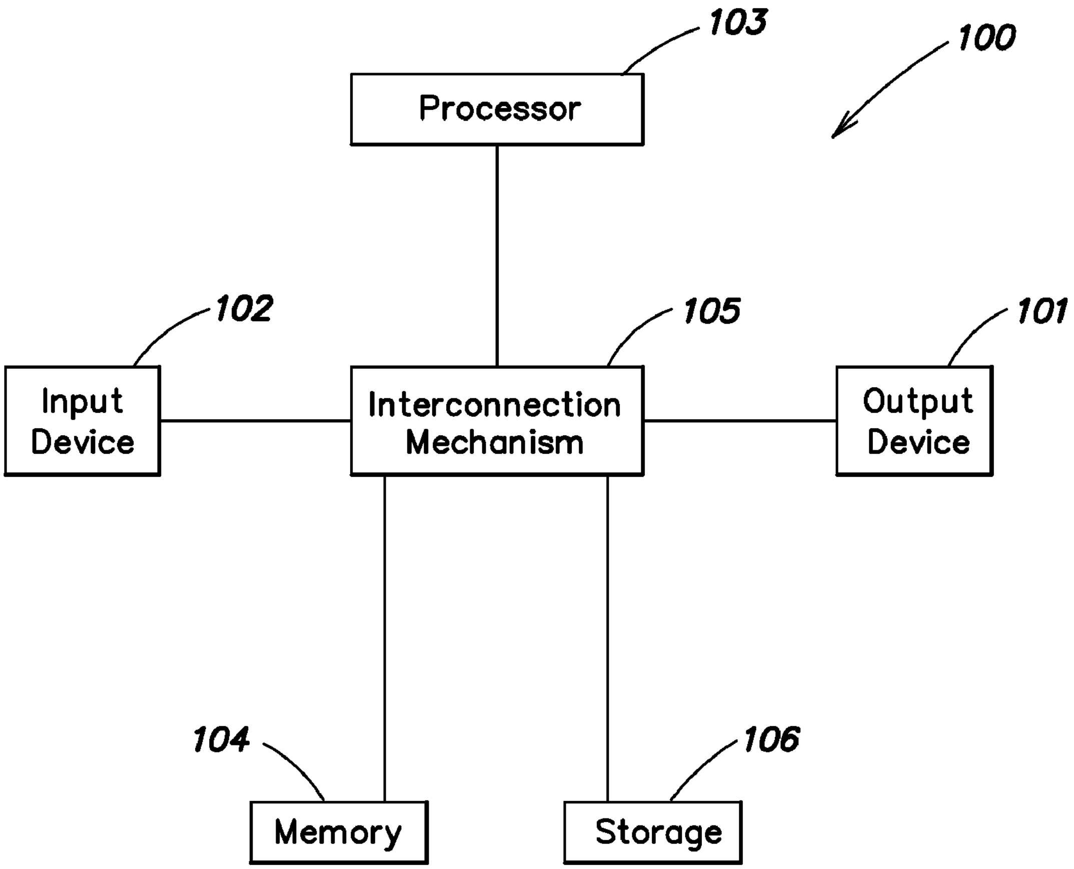
FIG. 1 shows an example computer system with which various aspects in accord with the present invention may be implemented.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Various embodiments according to the invention may be implemented on one or more computer systems. These computer systems may be, for example, general-purpose computers such as those based on Intel PENTIUM-type processor, Motorola PowerPC, Sun UltraSPARC, Hewlett-Packard PA-RISC processors, or any other type of processor. It should be appreciated that one or more of any type computer system may be used to predict the outcomes of combinations of events possible during a baseball game, such as the result of a particular pitcher/batter match-up where the pitcher and batter make particular decisions regarding the pitch and swing they will execute and their abilities to execute those pitches and swings correctly, according to various embodiments of the invention. Further, the baseball event outcome prediction system may be located on a single computer or may be distributed among a plurality of computers attached by a communications network. Various inputs to the system may be received from one or more individual users of the one or more computers or processors, or may be received from other parts of the system which have been designed to produce the necessary inputs.

A general-purpose computer system according to one embodiment of the invention is configured to perform any of the described input, computation and/or output functions including but not limited to determining characteristics of a pitch selected for and executed by a pitcher modeled in the system, determining characteristics of a swing selected for and executed by a batter modeled in the system, computing the result of combining the execution of the pitch selected with the execution of the swing selected and displaying the result in a manner useful to one or more users of the system. It should be appreciated that the system may perform other functions, including network communication, and the invention is not limited to having any particular function or set of functions.

For example, various aspects of the invention may be implemented as specialized software executing in a general-purpose computer system 100 such as that shown in FIG. 1. The computer system 100 may include a processor 103 connected to one or more memory devices 104, such as a disk drive, memory, or other device for storing data. Memory 104 is typically used for storing programs and data during operation of the computer system 100. Components of computer system 100 may be coupled by an interconnection mechanism 105, which may include one or more busses (e.g., between components that are integrated within a same machine) and/or a network (e.g., between components that reside on separate discrete machines). The interconnection mechanism 105 enables communications (e.g., data, instructions) to be exchanged between system components of system 100.

Computer system 100 also includes one or more input devices 102, for example, a keyboard, mouse, trackball, microphone, touch screen, and one or more output devices 101, for example, a printing device, display screen, speaker. In addition, computer system 100 may contain one or more interfaces (not shown) that connect computer system 100 to a communication network (in addition or as an alternative to the interconnection mechanism 105.

Figure 2:
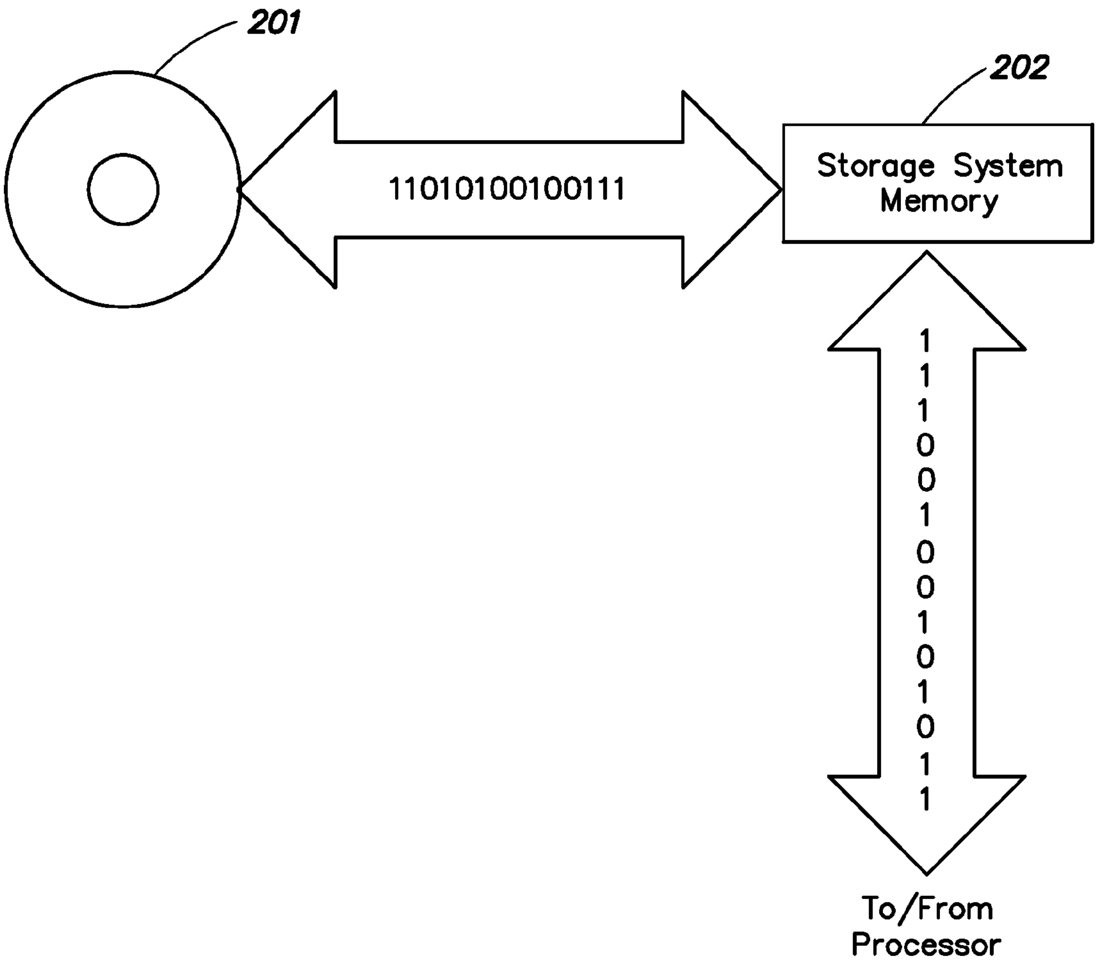
FIG. 2 illustrates an example distributed system including an embodiment.

The storage system 106, shown in greater detail in FIG. 2, typically includes a computer readable and writeable nonvolatile recording medium 201 in which signals are stored that define a program to be executed by the processor or information stored on or in the medium 201 to be processed by the program. The medium may, for example, be a disk or flash memory. Typically, in operation, the processor causes data to be read from the nonvolatile recording medium 201 into another memory 202 that allows for faster access to the information by the processor than does the medium 201. This memory 202 is typically a volatile, random access memory such as a dynamic random access memory (DRAM) or static memory (SRAM). It may be located in storage system 106, as shown, or in memory system 104, not shown. The processor 103 generally manipulates the data within the integrated circuit memory 104, 202 and then copies the data to the medium 201 after processing is completed. A variety of mechanisms are known for managing data movement between the medium 201 and the integrated circuit memory element 104, 202, and the invention is not limited thereto. The invention is not limited to a particular memory system 104 or storage system 106.

The computer system may include specially-programmed, special-purpose hardware, for example, an application-specific integrated circuit (ASIC). Aspects of the invention may be implemented in software, hardware or firmware, or any combination thereof. Further, such methods, acts, systems, system elements and components thereof may be implemented as part of the computer system described above or as an independent component.

Although computer system 100 is shown by way of example as one type of computer system upon which various aspects of the invention may be practiced, it should be appreciated that aspects of the invention are not limited to being implemented on the computer system as shown in FIG. 1. Various aspects of the invention may be practiced on one or more computers having a different architecture or components than that shown in FIG. 1.

Computer system 100 may be a general-purpose computer system that is programmable using a high-level computer programming language. Computer system 100 may be also implemented using specially programmed, special purpose hardware. In computer system 100, processor 103 is typically a commercially available processor such as the well-known Pentium class processor available from the Intel Corporation. Many other processors are available. Such a processor usually executes an operating system which may be, for example, the Windows 95, Windows 98, Windows NT, Windows 2000 (Windows ME) or Windows XP operating systems available from the Microsoft Corporation, MAC OS System X operating system available from Apple Computer, the Solaris operating system available from Sun Microsystems, or UNIX operating systems available from various sources. Many other operating systems may be used.

The processor and operating system together define a computer platform for which application programs in high-level programming languages are written. It should be understood that the invention is not limited to a particular computer system platform, processor, operating system, or network. Also, it should be apparent to those skilled in the art that the present invention is not limited to a specific programming language or computer system. Further, it should be appreciated that other appropriate programming languages and other appropriate computer systems could also be used.

One or more portions of the computer system may be distributed across one or more computer systems coupled to a communications network. These computer systems also may be general-purpose computer systems. For example, various aspects of the invention may be distributed among one or more computer systems configured to provide a service (e.g., servers) to one or more client computers, or to perform an overall task as part of a distributed system. For example, various aspects of the invention may be performed on a client-server or multi-tier system that includes components distributed among one or more server systems that perform various functions according to various embodiments of the invention. These components may be executable, intermediate (e.g., IL) or interpreted (e.g., Java) code which communicate over a communication network (e.g., the Internet) using a communication protocol (e.g., TCP/IP).

It should be appreciated that the invention is not limited to executing on any particular system or group of systems. Also, it should be appreciated that the invention is not limited to any particular distributed architecture, network, or communication protocol.

Various embodiments of the present invention may be programmed using an object-oriented programming language, such as SmallTalk, Java, C++, Ada, or C# (C-Sharp). Other object-oriented programming languages may also be used. Alternatively, functional, scripting, and/or logical programming languages may be used. Various aspects of the invention may be implemented in a non-programmed environment (e.g., documents created in HTML, XML or other format that, when viewed in a window of a browser program, render aspects of a graphical-user interface (GUI) or perform other functions). Various aspects of the invention may be implemented as programmed or non-programmed elements, or any combination thereof.

Baseball is a game well-known to be in love with statistics. For every event in a baseball game, a statistic is kept by someone, somewhere. Among the most common statistics are such vital numbers as the batting percentage achieved by a particular batter against a particular pitcher, the overall batting percentage achieved by any particular batter, a batter's on-base percentage, a pitcher's earned-run average, and many others. Interestingly, and importantly, none of these statistics can tell one what the outcome of a particular match-up between batter and pitcher will be, nor can they inform a pitcher or batter as to the best strategy to adopt with respect to an impending match-up in a real or hypothetical game.

Major League Baseball, for example, keeps an extensive database of the performances of their professional ball players. The data base of Major League Baseball, on a pitch-by-pitch basis and in conjunction with underlying scientific principles and exhaustive scouting evaluations of pitchers and hitters, we have discovered, allows an analysis of the causal relationships for the effect of each pitch of a given at bat. This is the true paradigm for baseball. Using a more scientific understanding which we have developed, along with the concepts of latency and engram in a computer-implemented method and apparatus, will make results produced by our model, method and apparatus congruent with the actual realities of the real game of baseball.

Latency

When light or an image reaches the retina it has traveled at the speed of light, at 186,000 miles per second. Once it forms on the retina, a chemical process begins which produces an electrical signal transmitted to the visual cortex of the brain. This transmission time takes about 100 milliseconds or a $1/10$ of a second. For ordinary events occurring in life, this one tenth of a second delay in the image forming in the consciousness has no importance: however, when a 90 MPH (132 ft per sec) ball travels the 55 ft from the pitchers release point to the front of the plate, taking only 0.4167 seconds of flight time, then $1/10$ of a second is very significant. Latency warps the perception of time, space, motion and location of the pitched ball on the part of the batter. It is not just the reduction in reaction time available to the batter, but it creates a dynamic, which makes some pitches impossible to hit because the early part of the pitch looks similar to another pitch and/or the ball has motion during the part of the pitch masked to the batter by latency. In addition, it enables the pitcher to utilize motion, velocity, location, and sequencing of pitches to manipulate time and space, which makes the hitter's task very difficult. Yet, hitters find a way to produce success about $1/4$-$1/3$ of the time. This complex situation is not simply modeled by an assumption that the last 100 milliseconds of the ball's flight goes unobserved by the batter or by an assumption that the pitch is simply foreshortened in the perception of the batter by 100 milliseconds. Rather, a complex interaction of the parts of the sequence occurs.

Figure 3:
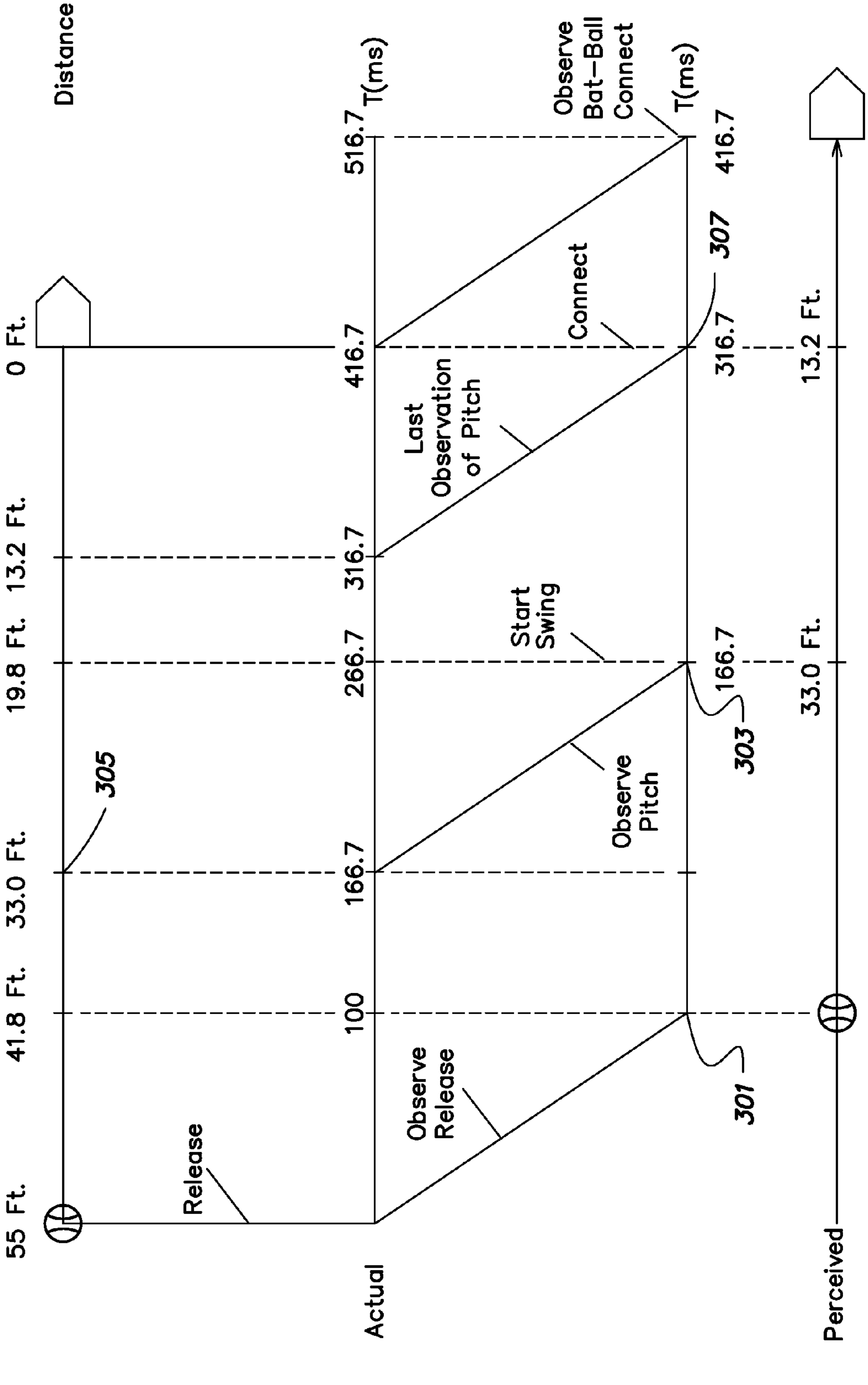
FIG. 3 illustrates the effect of latency on a batter's swing selection and timing.

Consider the situation illustrated in FIG. 3. The pitching rubber is 60 ft 6 in from home plate; the pitcher's release point is assumed to be about 55 ft from the plate. When the hitter sees the ball coming out of the pitcher's hand, it has been, in actuality, traveling towards the plate for $1/10$ second prior to the perceived release time. In fact, if the ball is thrown at 90 MPH (132 ft per sec) then the ball, at point 301, would be 13.2 ft from the pitcher's hand, or 41.8 ft from the contact area, before the hitter sees the ball coming out of the pitcher's hand. That $1/10$ of a second represents 24% of the time required for 90 MPH pitch to travel from the release point to the contact area. This 24% of transmission time has already occurred, and the hitter is totally unaware of this fact. When the ball reaches a point about 19.8 ft from the plate, at a time of 266.7 milliseconds from the release, point 303, the batter must begin his swing. The batter perceives this point as that point 100 milliseconds earlier, point 305, when the ball appears to be 33.0 ft from the plate. The batter will have had 166.7 milliseconds in which to decide whether to swing or modify a mentally pre-selected swing to compensate for the batter's observation of the pitcher and the pitch, but the pitch will have traveled another 100 milliseconds, to the point 303, 19.8 ft from the plate. Next, the batter makes contact between bat and ball, at point 307, 316.7 milliseconds after observing the release of the pitch, when the batter perceives the ball to still be 13.2 ft in front of the plate. The batter will not observe contact until 416.7 milliseconds from the observed release, if at all, 100 milliseconds after contact actually occurs and 516.7 milliseconds from the actual release.

Figure 4:
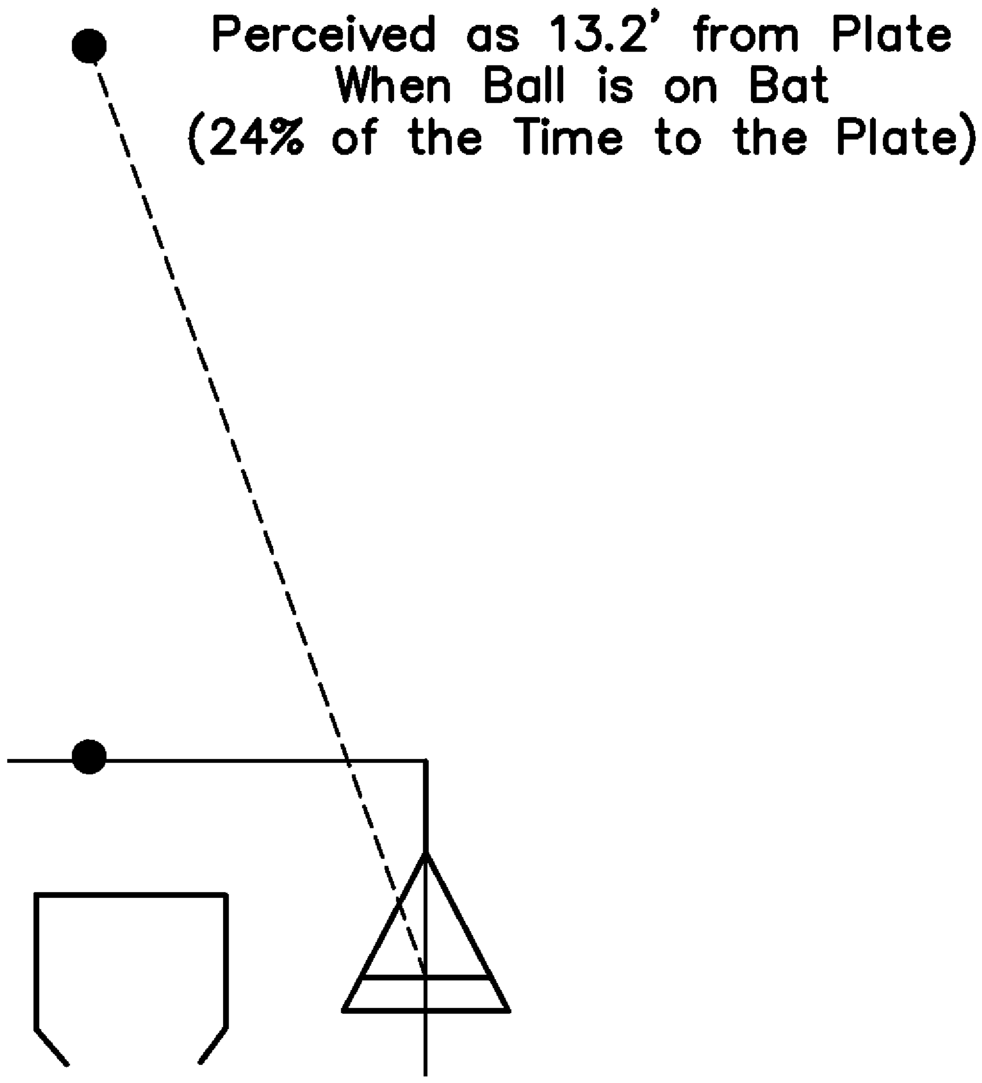
FIG. 4 illustrates the final interval of a batter's swing.

Throughout the flight of the ball the hitter's perception is always 1/10 of a second behind actual time of the ball's flight, so that at the moment of contact (assuming the batter swings and hits the ball) the hitter perceives the ball as if it were 13.2 ft from home plate, as shown in FIG. 4.

Engrams

What are engrams? Engrams are a concept to explain memory. It means a tracing, and refers to postulated bio-chemical changes to neural tissue resulting in retention of the memory of an event, concept, circumstance, etc. in the brain. Engrams are also used to explain the accurate repetition of physical movements especially those of a complex nature, sometimes called "muscle memory."

It is postulated that, in the process of learning a highly complex physical movement, that the sensory nervous system integrated with the vestibular, i.e. balance, and conscious proprioceptive, i.e. sensory, systems act as a template of correctness in any physical movement. The total perception is integrated but most commonly expressed by those who execute these tasks, as being a "feel" or "touch" that confirms the correctness of the movement at the moment of completion.

Once a person who is trying to develop a highly complex physical movement sees that he or she has performed the movement correctly by the "feel" or "touch," and in appropriate circumstances, visual as well as total body balance, then he or she, can by utilizing this integrated sensory engram of perfect quality, and thus by repetition of the physical movement exactly create a motor engram. That motor engram will automatically, in the future, generate a perfect movement which conforms completely to the sensory engram. With reinforcement of the engram by perfect practice, the individual then develops a skill which produces intended results time after time. If there is a deviation from this ideal then the sensory engram, acting as a judge of quality of the performed motor skill, immediately recognizes the error. The individual executing the skill is immediately made aware of the failure to execute, and can correct the failure upon the next opportunity.

Pitching and hitting demands skills at the professional level which are often absent. They can be attained by those athletes having the requisite raw abilities, through this repetitive process of training "engrams" (mental libraries of swings and throws) for each type of hitting or pitching situation, which allow pitchers and hitters to counter each other's individual strategies.

Latency and engram, when used by a pitcher, enable the pitcher to camouflage the various pitches. This deceives the hitter, inducing him to miss or mis-hit the pitch.

Engrams, perfectly formed, are the basis of both a hitter's and a pitcher's ability to execute. Thus, the selection of the proper swing or pitch, i.e. selection of the correct engrams, and their proper execution is the ideal the pitcher and hitter strive for in playing the game.

Before going on to describe exemplary apparatus and methods, the effects of latency and engrams are further described. Latency warps the perception of time, space, motion and location of the pitched ball as it is perceived by the batter. Latency does not merely reduce the reaction time available to the batter, but it creates a dynamic which makes some pitches impossible to hit because they appear to be one pitch during the period of time the batter has to recognize a pitch, but finish up differently than the pitch they appear to be. In addition, latency enables the pitcher to utilize motion, velocity, location (engrams) and sequencing of pitches to manipulate time and space, making it difficult for the batter to anticipate (rather than recognize) a particular pitch.

Latency produces for the hitter perceptual difficulties at all points along the pitch delivery time continuum, from the release point from the pitcher's hand to the plate. There is a 100 milliseconds delay in forming an image in the hitter's consciousness. This means that the last quarter of the flight of a 90 mile an hour fastball is not seen by the hitter at all, if he indeed swings at the ball, until after the batter has either connected with the ball or missed entirely.

Also, in the case of a knuckle ball, such as those pitched by Red Sox pitcher, Tim Wakefield, if it moves due to an imbalance of air pressure about the ball during the last fifth of its flight to the plate, it is not hittable or catchable, depending on the direction and amount of the movement of the ball.

Because of latency, the ball cannot truly be tracked to contact, which affects contact to some degree. However, the chief difficulty generated by latency is the requirement to begin a swing on a 90 mile an hour fastball before the hitter can differentiate that pitch from pitches of lesser velocity and movement. This sets up the hitter to swing and miss at pitches which are impossible for him to hit, if the pitcher properly executes the delivery of the pitch and the batter has not properly anticipated (i.e. guessed or calculated) the speed and location of the "impossible to hit" pitch. Therefore, if a batter is successfully hitting fastballs, then, if his intention is to swing when the pitch looks like a strike down the middle of the plate, then the batter would swing and miss over the top of off-speed pitches because they look like the fastball down the middle of the plate, but fall off more quickly.

Without latency the game of baseball would not be possible. With latency but without precisely developed engrams, there would be no camouflaging of pitches but rather each pitch would be consistently inconsistent as it sometimes is in amateur ball.

In accordance with some embodiments, the game is controlled by a touch screen linked to the computer or Internet connection. All the decisions that can be made by a coach, manager or participant on the field, can be made by one or more users, while the abilities and capabilities of the virtual players are represented in a database from which they can be retrieved in response to the users' choices, so the virtual reality will agree without exception to the real game.

All of the elements of all aspects of the real game of baseball have direct and dynamic representation moment by moment in some embodiments. The graphic and auditory representations will be, as far as is technically possible, identical. In other words, the real game of baseball, the pre-series preparation, and the Internet computer game will demand exactly the same scouting reports and mental decisions. A game player will not be able to command a virtual pitcher or hitter to pitch or hit in a manner that would not be part of his engram library of skills and makeup in the scouting reports programmed into our game. The database of pitchers and hitters pitch-by-pitch history is integral to embodiments, so that the database determines whether a particular decision on the part of a game player will result in a ball, strike, out, hit, walk, homerun, etc.

In the real game, the pitchers must decide in their own minds, in advance, what they intend to do on the next pitch in order to produce a desired suggestion in the hitter's mind. The speed of the real game is much too fast to allow a mid-course event discussion to be made.

Well, if during a real game, the pitcher and hitter simply, prior to each pitch encode their intentions into a computer, then, the real game events would be absolutely the same as it would unfold in a pre-series simulation or a virtual game, save for the randomness of execution on a pitch-by-pitch basis. So, randomness is programmed to occur in virtual reality as it does in the real world and this randomness of execution makes the game, on a pitch-by-pitch basis, filled with myriad possibilities.

Some embodiments have handheld computer tablets with touch and writing capability so that, prior to each pitch various decisions which must directly and intrinsically affect the outcome of the game on a cause and effect basis but with the randomness of execution factored in with each pitch. These decisions in the real game must also be made in the professional game prior to each pitch. This must be universally noted, engrams of baseball skills cannot be made up, ad hoc, in the middle of a given pitch. The human body and the human mind are not anywhere remotely, that quick.

Engrams of skills in baseball as to pitching and hitting must be pre-slotted and maintained in the cerebrum, prior to each pitch. The existence of these engrams for individual players will be pre-slotted into our computer program embodiments. On the player's electronic tablets there will be areas for the positioning of fielders and putting them in motion with the anticipation that the ball will be hit in their direction. Other variables will provide for pick-off plays, stolen bases, pitch-outs, hit and run plays, etc.

As mentioned, each pitcher and hitter will have an exhaustive scouting evaluation. This is expressed for hitters by the variety of distinct but functionally necessary swings needed to accomplish specific tasks. Such things as a hit and run, bunt, e.g. base hit or sacrifice, and ways to countervail the strategy to produce outs which will occur if the proper swing is not brought forward from a complete library of swings.

For pitchers, the scouting report will enumerate the number of pitches, the quality of execution, e.g. as percentages of each pitch and the particular excellence of each pitch rated against all major league pitchers.

In similar fashion, the particular excellence of each swing of a particular hitter, graded against all major league hitters both to energy input and necessarily the frequency of contact.

No player, whose skills are what they are in reality, can be made to execute skills which they do not have in the virtual game. There is an absolute identity in the real and virtual games of all skills, weaknesses, strengths and lack of skills of all the pitchers and hitters. The heading of "makeup" which we believe to be the overarching quality of success or failure in the game and in life will also be part of the underlying scouting factors.

On the handheld tablet will be the areas in which the pitcher must designate the kind, spin and velocity and location intended with each pitch. The hitter will have to indicate in which area of the plate he intends to be strong. The hitter must decide whether he is swinging, perhaps dependent upon certain selectable criteria or taking the pitch.

Even events such as the catcher's mitt tipping the hitters bat and "balks" can be represented by underlying random factors in some embodiments of aspects.

Hitting Progressions

As mentioned, the hitter and the pitcher must declare their full intention before each pitch. The pitcher puts causality into each pitch through the velocity, location, spin, and the initial angle of release from the pitcher's hand. There are also random factors such as wind on a particular day in a particular ball park that also affects the ball's flight. In embodiments of aspects, users will select these particulars, prior to each pitch.

This must he emphasized, to fix it in the player's mind, that spin, crisp terminal spin, which is a function of the spin rate per minute is the primary indicator of a pitching success either for a strike out or more importantly a mis-hitting of the ball in the direction of the spin.

Swing and miss pitches, without mechanical holes, will accomplish their intended end by spin, crisp tight spin. A pitcher intending to pitch to the center of the plate, can often generate swing and miss pitches because of an optimal spin put on that pitch. As a particular at-bat unfolds, and moves towards a defining climax, it results either in a walk, a strike-out, or a ball put into play.

Whatever pitch initially chosen does not matter, for this illustration, rather the possibilities of each pitch in the sequence will follow this outline so an understanding of the virtual game will follow reality. The same choices must be made in the real game, as those inserted into the virtual game. So let us for the sake of simplicity say that fastballs will be thrown every pitch.

The pitch, if the batter intends to take it, will either be a ball or a strike. If the hitter intends not to swing (limited to qualification of that pitch) then, if the pitch is outside the strike zone, it will be called a ball, if the pitch is outside of the qualifying hitting area, or a pitch other than what the hitter is looking for, but is still within the strike zone, the pitch will be called a strike.

However, if the hitter swings at the pitch, either contact or no contact is made. If the hitter swings and misses, it is recorded as a strike. To this point things evolve simply on an either-or basis, which, for computing, greatly reduces the difficulties in the coding of the program.

If contact is made, the ball will either be put into play or not into play. If the ball is not put into play, then the hit ball was a foul ball going off the point of collision as a ground ball, line drive, popup, foul tip, foul line drive backwards, etc.

The cause and effect element of the contact has its basis in the kind of pitch thrown and the swing chosen, in which the tendencies of the pitch, i.e. location, spin, rate of spin and velocity, just as in swing-and-miss pitches, determines the angle of incident of the ball off the bat.

All these events are recorded on a pitch-by-pitch basis and the aggregate gives the probability of a swing, going to swing and miss, foul balls of all varieties, or a ball put into play.

The statistics, being the mean of all identical pitches, are weighed by a multiple of the pitcher/hitter evaluation ratio. That is, the comparison of pitcher and hitter as to skills expressed numerically and is multiplied by the statistical mean of the database to give a close approximation of how these results would unfold by these particular combatants.

Once the resultant is computed, then the graphics and auditory component will be appropriately called forth to represent this outcome. It will show the results of these decisions.

The real game of baseball is, at the professional level, possible only through the concept of latency and the actualization through the concept and fact of engrams. The scientific underpinnings of the virtual game according to embodiments of aspects are exactly identical to those of the real game.

Without the inherent scientific principles both physical and biophysical, the virtual game could not be constructed. It is one thing to show the causative relationships that lead to success, but baseball is a game of failure of one or the other competitors pitch by pitch, which defines, essentially, the game.

At the professional level, without latency, professional hitters would completely dominate, and virtually every at bat would be a well hit ball either inside or outside the park. Latency creates a degree of difficulty for the hitter that allows for the competition that we see in the game of baseball.

In like fashion, with swing and miss pitches, consistent manipulation of the mechanical holes of hitters and the sequencing of complimentary pitches at the margin of the strike zone, the game can he tilted towards pitching to such a degree that the game would be less interesting. There would be little or no hitting, especially of the extra base variety. This is what happens exactly when skilled aces oppose one another in an important game such as the post-season games.

But what marvelous baseball there can be when you have hitters who can situationally hit. Every pitch is a facet of a masterpiece of physical, intellectual, and mental competition. Knowledgeable fans can anticipate pitch after pitch, strategy versus strategy. This draws them into the fabric of the game. And it is achieved in aspects of embodiments by allowing players to select from realistic libraries of statistically measured and accurate performances, i.e. engrams, realistic strategic combination of actions.

As in all things there are gradations in attainment of skills throughout life. The same will be true of baseball to some degree. Since baseball has only 750 slots at the major league level, with a bevy of talented players in the minor leagues who may never be given a chance, the accumulation of talent about the mean is profound. The talent, especially with proper development of both hitters and pitchers, will be driven into higher attainment and ability to execute skills.

By using aspects of embodiments, a team, coach, league or individuals can develop more knowledgeable and skilled pitchers and hitters in the professional game, but also, throughout the population of baseball fans, amateur players and coaches. We hope they will obtain a better understanding of the game and acquire, if they are players, skills needed to be successful.

Essentially the game, played at an optimal quality of performance, is "execution". Execution of what? A library of mechanically distinct skills (engrams) are needed to, repetitively, within a consistently narrow range, execute the strategy based upon underlying scientific principles.

The real game of baseball is execution of skills (engrams), not of scientific principles per se, but of physical, mechanically perfected, skills by the pitcher and hitter that are necessary in a game where latency and engrams are the determining elements. What we intend to patent is the computer simulation of all information put into the computer by the handheld tablet in order to factor in the intentions of the pitcher on each pitch, i.e. speed, spin and location and the intentions of the hitter as to what kind of swing he will choose to counter the strategy of the pitch he is anticipating. The resultant of pitch and swing, with randomness factored in, will produce a particular energy and angle of incidence of the ball off the bat. The resultant of those forces determines the trajectory of the ball off the bat.

As in the real game, pitch-by-pitch decisions and variations in the execution intended, give the variety of outcomes that reflect the success or failure of the pitcher or hitter. Variations in outcomes occur more frequently in pitching than in hitting because of the many variables in the mechanical delivery of a particular pitch. A deviation of three or four inches can significantly change the outcome of a particular pitch for both pitcher and hitter.

As a pitch intended for a particular location with the concomitant spin and velocity deviates in that trajectory, the success of the pitcher and hitter will vary inversely. A pitch, in the heart of the strike zone, tends to be hit with greater production [hits, extra base hits, contact, and force] for the hitter. This is usually the result of causal deviation in the intended trajectory of the pitch. The converse is equally true. A well planned and located pitch, which is not countervailed by a pre-slotted swing of the hitter, produces success for the pitcher.

As previously discussed, the exhaustive scouting evaluations of all pitchers and hitters, will be intrinsically united to underlying scientific principles related to the optimum library of skills. In embodiments of aspects of the invention, the library of skills attributed to each player is recorded in a computer memory as a database of the players' skills. Here is the pitcher. Here is the hitter. Then, the game, the virtual as well as the real game, can begin.

We have gone through the tree of variables that can occur with each pitch. When an event occurs such as a foul ball or a ball put into play, the pitch-by-pitch database of major league baseball will (in combination with information from the handheld terminal and the underlying scientific integration with the players' and pitchers' attributes), generate a resultant which is consistent with reality.

We cannot patent space, time, motion, gravity, trajectories, magnus effect, latency and engrams, just as Edison could not patent electricity. However, Edison, and his development of the filament within his incandescent light bulb, was patenting the effect of the scientific principle of electricity to produce light through the medium of his filament. In the very same fashion, all underlying scientific principles are encompassed in the pitchers' and hitters' stratagems mediated through their selected engrams to impart causality [the underlying science]. Then their pitch and swing produce a causally determined effect at the plate. Like Edison's employment of electricity to produce the effect of light in his bulb, the pitcher and hitter, through the multiplicity of causal variables, pre-selected and randomized to quality of execution, do produce many causally linked effects, on a pitch-by-pitch basis, at the plate.

All the underlying scientific principles necessary for baseball excellence are refined through repetitive practice of the pitchers and hitters' skills. The quantity and quality of these skills are encoded into the computer and combined with the database specified for a particular hitter and pitcher confrontation. This will produce an effect from a given pitch, which is virtually identical with the real game.

This effect, pitch by pitch, is simultaneously presented by graphic representation of this baseball event and the auditory environment that is attendant during major league games.

Since the real game of professional baseball is only possible by the latency phenomenon, through perfectly formed skills (engrams), intended to create a deceiving perception in the hitter's mind, leads the hitter, hopefully in the pitcher's view, to miss or miss-hit the ball. Embodiments of aspects implement this phenomenon during the creation of the performance of the hitter and how that performance matches up with the performance of the pitcher, such that the hitter can adjust his swing only in response to those aspects of the pitcher's performance which it is possible, given latency of about 1/100 sec., for the hitter to perceive. The hitter thus attempts to countervail this strategy by an appropriately anticipated swing, adjusted according to what latency permits the hitter to perceive.

To provide the necessity for simulating the real game, the computer game, is dependent on an identical logical foundation. Therefore, our patent should be the only route to a virtual game based on the reality of baseball. This should provide unimpeded use for the life of the patent.

Review of the Hitter/Pitcher Competition in Embodiments and the Real Game of Baseball Essentially, there are three types of pitches: swing and miss, swing to mishit, and swing to contact pitches. Swing and miss and swing to mishit pitches are possible because of the latency of retinal image transmission through the optic nerve to the visual cortex which warps the perception of time, space and motion in the hitter's consciousness of reality during the flight of the pitched ball, especially at professional velocities. In addition, the pitcher can and does camouflage pitches through the various engrams (types of pitches) perfected as the quality of execution. The reality of latency and engrams is the enabling foundation of professional baseball. No latency; no game.

It is at the margins of the strike zone that the complete library of skills of pitcher and hitter vie for success by well grounded strategies of the competitors. Swing and miss and swing to mishit pitches can be countervailed by the hitter with a complete library of swings that are well chosen against the correctly anticipated strategic pitch of the pitcher.

It is this interaction of stratagems of pitcher and hitter which is implemented trough the various pitches and swings (engrams) which we are patenting. The computer program will function to produce, on a pitch-by-pitch basis, a progression through a given at bat which is identical to what may occur in the real game. The causal determinants of the real and virtual games being identical will generate an identical resultant effect in each.

The implementations of underlying scientific principles through the engrams of the competitors in the pitcher and hitter confrontation in the real game, is the identical cause and effect dynamic of the virtual game. Therefore embodiments of aspects of the invention produce this identity of real and virtual games by computing the causal analysis of the game of baseball which has been meticulously presented above, for each pitch and swing of a virtual game of baseball.

Swing and miss pitches are impossible to hit because of previously noted reasons, if the hitter does not have a predetermined countervailing strategy and swing. This contest of competing strategies is the essence of baseball. If swing to mishit pitches, with similar causal factors as swing and miss pitches, are to be successful, they will be thrown to the margins of the strike zone, usually down, with optimal spin of the ball. This will produce optimal movement. When a pitcher can execute at the margins of the strike zone with these quality pitches, the hitter even under the best of circumstances, is challenged significantly to generate offensive success.

Those hitters, who have a complete library of quality swings, causally united to underlying scientific principles, can, even with power, countervail the well expected, well located, and well formulated stratagems of the pitcher. Hitters who can execute well are few.

Swing-to-contact pitches are, as the pitch location moves deeper into the heart of the strike zone, mistake pitches. These pitches are not designed to go there but they are, to varying degrees, failures to execute properly.

Even mishit pitches, when the hitter puts the ball into play, have a better than 0.300 chance of going for a base hit. Swing-to-contact pitches increasingly, as they move into the heart of the strike zone, result in higher average and far greater in number of extra base hits. It is here in the heart of the strike zone with swing to contact pitches, that hitters have success in this compared to pitches at the margins.

When we create our own data base with high speed video cameras and high speed video recorders, we will be able to measure spin rates, angle of incidence of the ball off the bat and the precise swing time of the hitters. A highly accurate assessment concerning the potential of hitter and pitchers can be made with this technology.

The present invention and its embodiments have many uses. Embodiments can be played as a virtual game, e.g. a computer or console video game, but it can also be used as a scouting and/or training tool by professional or amateur baseball clubs. It could become integral to a major league ball club for such scouting and/or training purposes. The automated simulation and modeling of actual player engrams as an essential determining factor of execution and play will aid in training players for better performance, and also, in the long term, in player acquisition and development within all levels of baseball.

Computer software embodying aspects of the invention will, after all the necessary decisions by the virtual contestants are made prior to each pitch on the touch tablet, will produce a result on a cause and effect basis that is congruent with the real game, within the limitations of randomness of events and the degree of execution of the selected pitches of the specific pitcher and swings of each hitter as it is in the real game.

To do this, the computer must have a complete scouting evaluation of the tools and skills of each pitcher and each hitter. These evaluations of abilities and skills (engrams) are the underlying scientific determinants in the game program that will allow the game to operate on the real strength and weaknesses of specific pitchers and hitters. Major league baseball records each pitch thrown in competition which can be invaluable if properly utilized. A six-second videotape accompanies the accumulated data as to location, spin, velocity and sequence. This database will contain the random events such as Texas League fly ball, swinging hunts, broken bats off jammed hitters, etc. as well as accounting for the failure to execute precisely by pitchers and hitters, especially pitchers.

Logic of a Computer-Implemented Embodiment

Figure 5:
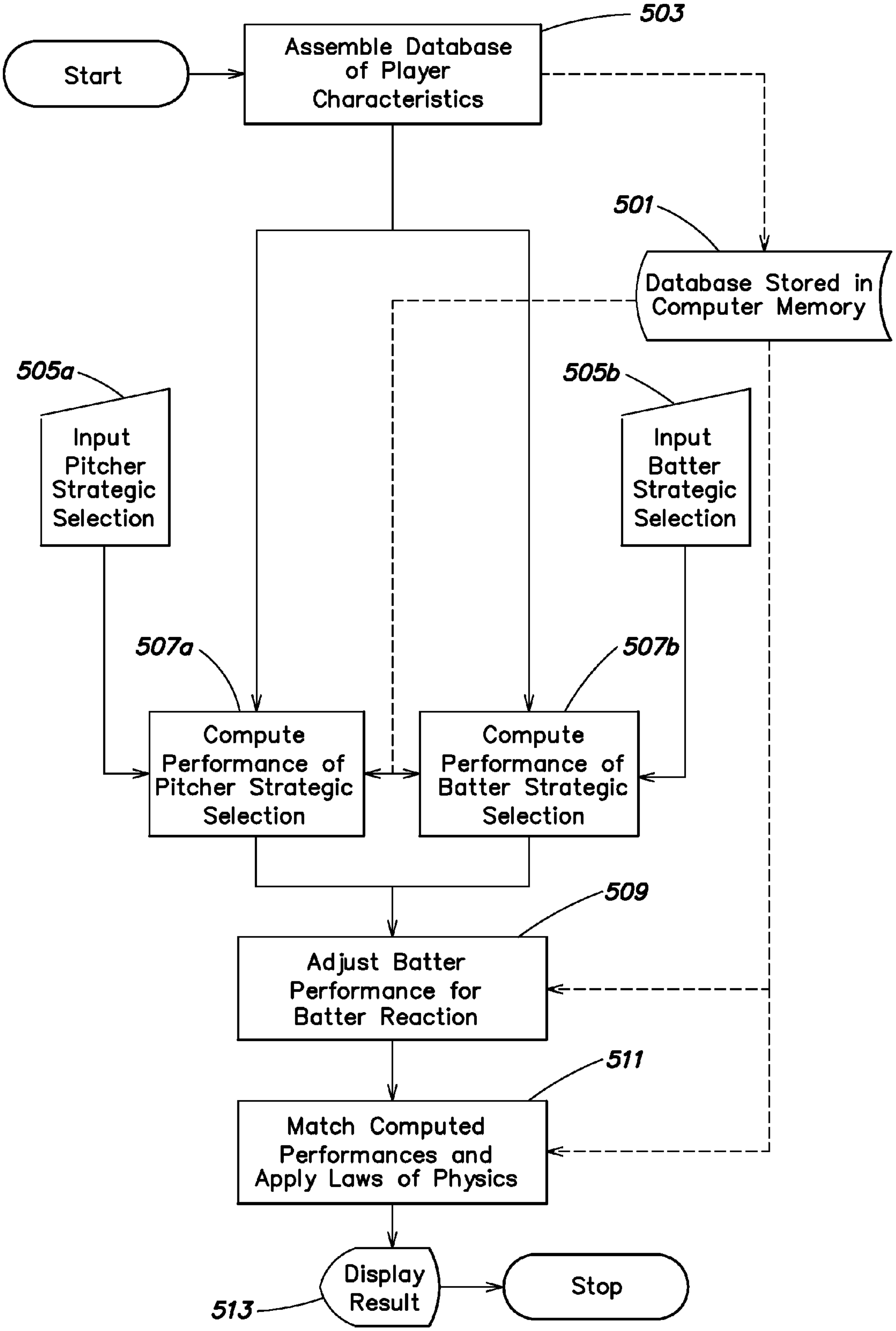
FIG. 5 is a flowchart of a process according to aspects of embodiments of the invention.

Reference is made to the flow chart of FIG. 5. First a database 501 of engrams for a plurality of baseball players is assembled 503 and stored in a computer memory. The database 501 includes, for example for pitchers, the types of pitches in a pitcher's repertoire, the speeds at which each pitch type is thrown, the spins given each pitch type, and any other desired performance data defining the pitcher's capabilities given various strategic selections within the scope of the pitcher's capabilities. Also included may be statistical information such as target-, speed- or spin-selection accuracy for a given pitcher. Similarly, for batters, the database includes, for example, the types of swing, bat-speed, and any other desired performance data defining the batter's capabilities given various strategic selections within the scope of the batter's capabilities. Also included may be statistical information such as the batter's "eye," i.e. ability to distinguish balls and strikes prior to swinging, the batter's ability to modify a selected swing during the early part of the pitcher's delivery, and the batter's accuracy in connecting with a predictable target with the bat head. Any other information useful for modeling the performance behavior of the pitcher and the batter taking into account the players' engrams and latency as described above can be included.

Next, for a given batter facing a given pitcher, one or more users make the strategic selections 505*a* and 505*b* that those players would make if they were playing a physical baseball game. For example, the user might select for the pitcher an initial pitch type, speed and spin for a sequence of pitches with which that pitcher has had success against the batter. The user making selections for the batter, without knowing the pitcher's selection, might select a swing type, speed and target, attempting to anticipate the pitcher's first pitch. The user selections can be keyed into any suitable user interface to a computer embodying aspects of the invention. The interface may be a touch screen, a keyboard, a game console controller or any other suitable interface.

Note that the user controlling the pitcher's strategic selections can select pitch sequences designed to fool a batter into selecting a swing that will produce a swing and miss results, while the user controlling the batter's strategic selections will attempt to select swings that anticipate the pitches the batter will see, so that little or no modification or adjustment during the pitch will be required.

One or more processors then compute the actions of the pitcher 507*a* and the batter 507*b*, including the behavior induced by each, respectively, on the ball and the bat, using the data from the database, modified by the statistical information in the database regarding accuracy of performance. Accuracy can be modified without such information in the database, but may not then track actual play as closely for the particular pitcher and batter. The batter's performance may be further modified 509 to account for those aspects of the pitcher's performance as computed 507*a*, for which latency permits sufficient time for the batter to do so. Finally, one or more processors match the computed performances, apply the laws of physics to the intersection (or not) of the bat and ball at a point of contact and produce a result 511, e.g. swing and miss, solid hit, bloop fly ball, etc. That result is then displayed using any suitable display technology or technique.

As explained above, matching the pitcher's performance to the batter's performance produces information about where, at what angle and with what force contact may be made (or not made, as may be). The sum total of information produced in that regard defines, by application of the laws of physics, where a hit ball is directed as a result of the combined performance, and thus what sort of outcome is likely.

Figure 6:
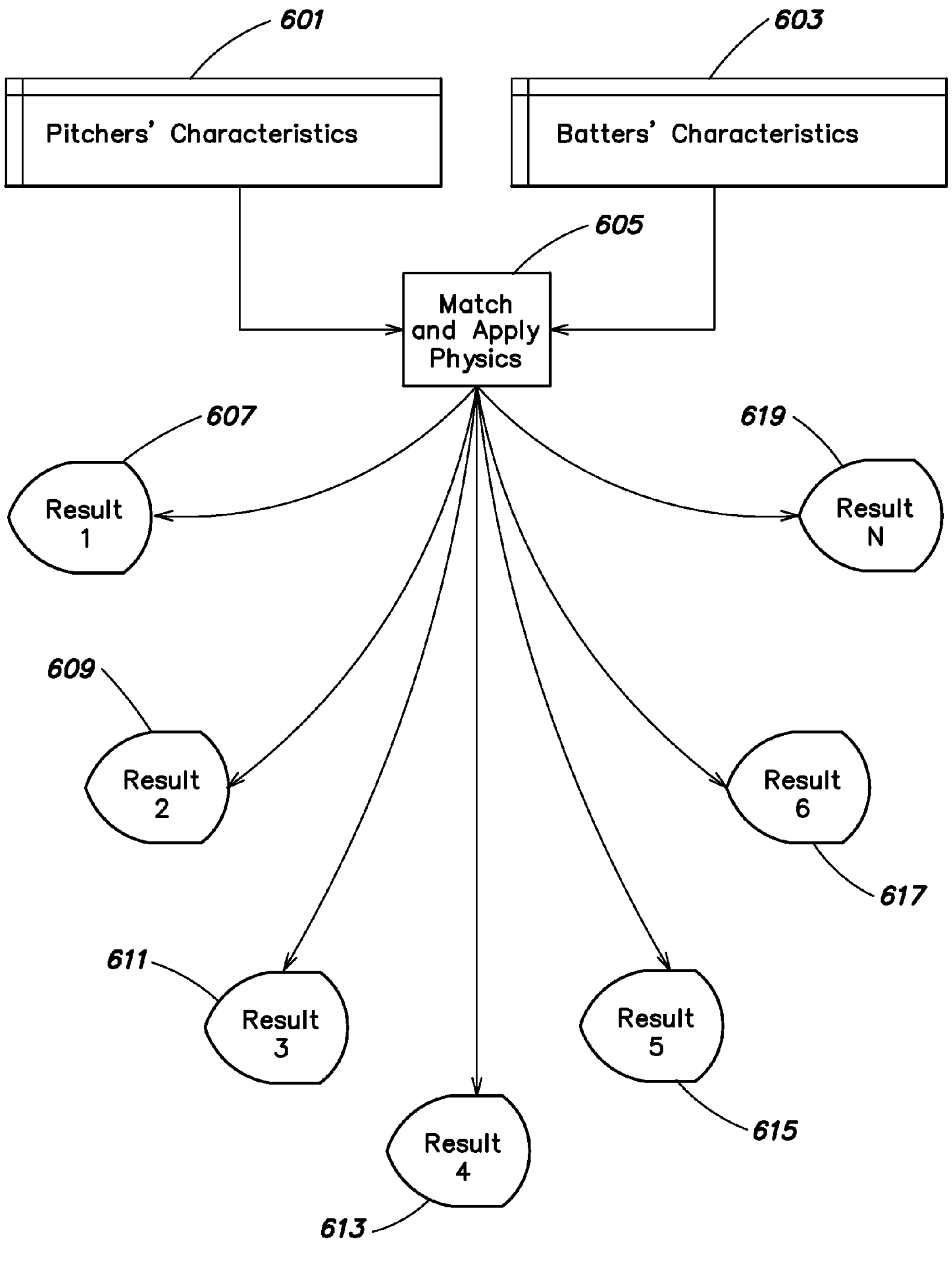
FIG. 6 is a process flow diagram illustrating other aspects of embodiments of the invention.

As shown in FIG. 6, the database holds a set of data describing the pitchers' various characteristics 601 and describing the batters' various characteristics 603. As described in greater detail above, the selected characteristics are matched, the batter's reaction given latency is taken into account and the laws of physics applied to the resulting performances 605. This produces one of several results, 607, 609, 611, 613, 615, 617 and 619, which can then be displayed or reported out. The results include such information as whether a combination of pitch and swing produced a swing and miss, a foul ball, a grounder to a fielder's position, a pop-up, a long fly ball or a hit.

In order to improve the accuracy with which embodiments of aspects identify and distinguish fielded balls and hits, the database can further include information about defensive alignments employed against particular batters, as well as detailed fielding capability information about the players defending when a particular pitcher and batter are matched up. Alternatively, the raw information can be displayed regarding how well-hit a ball a particular combination or sequence is likely to produce.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A computer-implemented method of providing a predicted outcome of hypothetical events which can occur during a game of baseball, comprising:

accumulating and storing in a computer memory a statistical database of the cumulative effects of latency and engrams specific to an individual batter having individual batter capabilities and an individual pitcher having individual pitcher capabilities;

selecting a pitch, by a user, from amongst pitches compatible with the individual pitcher capabilities;

selecting a swing, by a user, from amongst swings compatible with the individual batter capabilities;

computing in a computer processor a statistical performance of the individual pitcher of the selected pitch;

computing in the computer processor a statistical performance of the individual batter of the selected swing;

matching in the computer processor the statistical performance of the individual pitcher with the statistical performance of the individual batter so as to compute an outcome; and applying in the computer processor laws of physics to the outcome to compute the predicted outcome.

2. The method of claim 1, wherein matching further comprises:

determining to be a swing and miss those situations where a selected off-speed pitch is not anticipated by the user selecting the swing.

3. The method of claim 1, wherein matching further comprises:

determining to be a swing and miss those situations where a four-seam fastball above the belt is selected and the swing selected does not anticipate the four-seam fastball above the belt.

4. The method of claim 1, wherein matching further comprises:

determining to be a swing and miss those situations where a four-seam fastball above the belt having a change in velocity from an immediately preceding pitch is selected and the swing selected does not anticipate the four-seam fastball above the belt having a change in velocity.

5. The method of claim 1, wherein matching further comprises:

determining to be a swing and miss where the bat loops under the ball those situations where a selected pitch is targeted to an outside margin of the plate and the swing does not anticipate where the selected pitch is targeted.

6. The method of any one of claims 2 through 5, wherein matching further comprises:

determining the miss to produce incomplete contact resulting in a foul ball, ground ball, pop-up or fly ball.

7. The method of claim 1, wherein matching further comprises:

determining to be a solid contact those situations where a selected pitch passes through a central portion of a strike zone.

8. The method of claim 1, wherein matching further comprises:

determining to be a swing and miss those situations where a selected pitch has unexpected movement in a final 0.100 seconds of flight, making determination of pitch location by the batter impossible due to latency.

9. The method of claim 8, wherein the selected pitch is a knuckleball.

10. A computer-implemented method of preparing a baseball player to face an opposing baseball player, one player being an individual batter and another player being an individual pitcher, comprising:

accumulating and storing in a computer memory a statistical database of the cumulative effects of latency and engrams specific to the individual batter having individual batter capabilities and the individual pitcher having individual pitcher capabilities;

selecting a pitch, by a user, from amongst pitches compatible with the individual pitcher capabilities;

selecting a swing, by a user, from amongst swings compatible with the individual batter capabilities;

computing in a computer processor a statistical performance of the individual pitcher of the selected pitch;

computing in the computer processor a statistical performance of the individual batter of the selected swing;

matching in the computer processor the statistical performance of the individual pitcher with the statistical performance of the individual batter so as to compute an outcome; and applying in the computer processor laws of physics to the outcome to compute a predicted outcome.

11. A computer-implemented method of scouting a baseball player by evaluating performance against an opponent, one of the baseball player and the opponent being an individual pitcher and another of the baseball player and the opponent being an individual batter, comprising:

accumulating and storing in a computer memory a statistical database of the cumulative effects of latency and engrams specific to the individual batter having individual batter capabilities and the individual pitcher having individual pitcher capabilities;

selecting a pitch, by a user, from amongst pitches compatible with the individual pitcher capabilities;

selecting a swing, by a user, from amongst swings compatible with the individual batter capabilities;

computing in a computer processor a statistical performance of the individual pitcher of the selected pitch;

computing in the computer processor a statistical performance of the individual batter of the selected swing;

matching in the computer processor the statistical performance of the individual pitcher with the statistical performance of the individual batter so as to compute an outcome; and applying in the computer processor laws of physics to the outcome to compute a predicted outcome.

12. A computer-implemented method of training a baseball player to face an opposing baseball player, one player being an individual batter and another player being an individual pitcher, comprising:

accumulating and storing in a computer memory a statistical database of the cumulative effects of latency and engrams specific to the individual batter having individual batter capabilities and the individual pitcher having individual pitcher capabilities;

selecting a pitch, by a user, from amongst pitches compatible with the individual pitcher capabilities;

selecting a swing, by a user, from amongst swings compatible with the individual batter capabilities;

computing in a computer processor a statistical performance of the individual pitcher of the selected pitch;

computing in the computer processor a statistical performance of the individual batter of the selected swing;

matching in the computer processor the statistical performance of the individual pitcher with the statistical performance of the individual batter so as to compute an outcome;

applying in the computer processor laws of physics to the outcome to compute a predicted outcome; and instructing the baseball player regarding improvements to their performance indicated by the predicted outcome.

* * * * *